United States Patent [19]

Jones et al.

[11] 4,385,144
[45] May 24, 1983

[54] POLYESTER COMPOSITION

[75] Inventors: Jesse D. Jones, Baton Rouge; Robert B. Whitehead, Hammond; Edwin D. Hornbaker, Baton Rouge, all of La.

[73] Assignee: Ethyl Corporation, Richmond, Va.

[21] Appl. No.: 397,624

[22] Filed: Jul. 12, 1982

[51] Int. Cl.³ .......................... C08J 3/00; C08L 67/00
[52] U.S. Cl. .................... 524/114; 524/605; 525/438; 528/176; 528/297
[58] Field of Search ................ 524/114, 605; 525/438; 528/297, 309, 176

[56] References Cited

U.S. PATENT DOCUMENTS

| | | | |
|---|---|---|---|
| 3,368,995 | 2/1968 | Furukawa et al. | 524/605 |
| 3,516,957 | 6/1970 | Gray et al. | 524/605 |
| 3,886,104 | 5/1975 | Borman et al. | 524/605 |
| 4,065,438 | 12/1977 | Verborgt | 525/438 |
| 4,123,415 | 10/1978 | Wambach | 524/605 |
| 4,215,032 | 7/1980 | Kobayashi et al. | 524/605 |
| 4,276,208 | 6/1981 | Ogawa et al. | 260/28 R |

Primary Examiner—Lucille M. Phynes
Attorney, Agent, or Firm—Donald L. Johnson; John F. Sieberth; Henry C. Jeanette

[57] ABSTRACT

Improved injection moldability of polyethylene terephthalates is achieved by the addition of small amounts of at least one monoepoxyalkane. The injection moldability is further improved by the further addition of small amounts of an adjuvant synergistically cooperative with the monoepoxyalkane. The improved moldability and mold releasability is achieved even when the composition is injection molded at mold temperatures of at least as low as 93° C.

37 Claims, 1 Drawing Figure

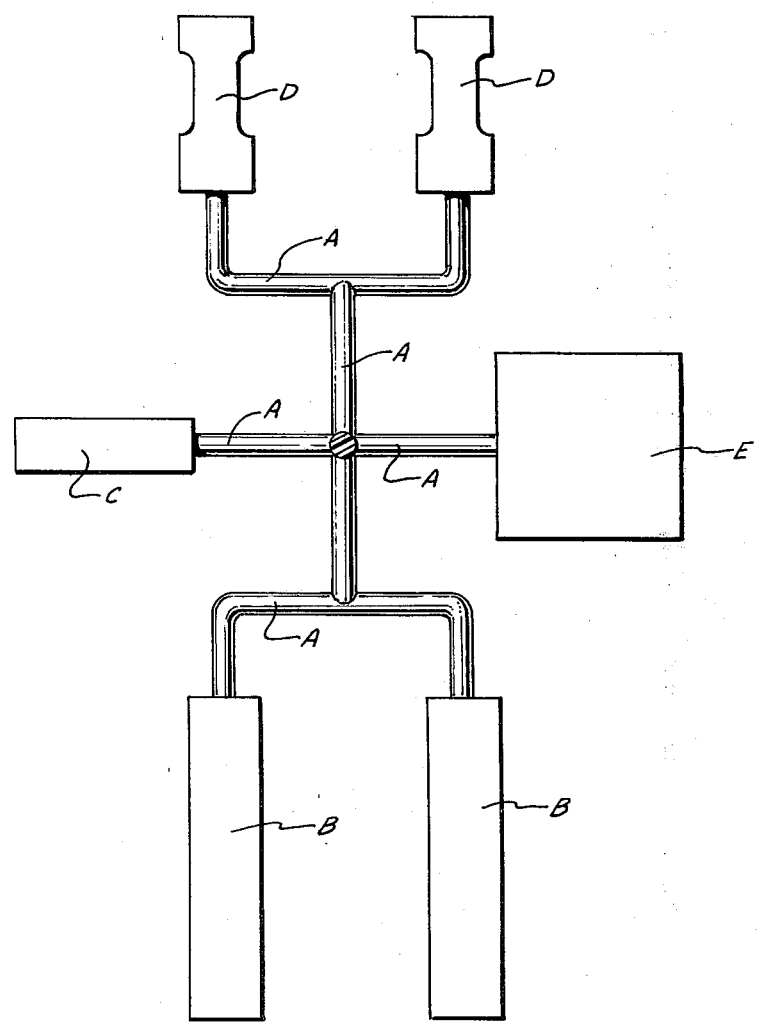

POLYESTER COMPOSITION

TECHNICAL FIELD

This invention relates to thermoplastic polyester compositions which are especially useful for injection molding operations conducted at relatively low mold temperatures.

BACKGROUND

It has long been known that polyethylene terephthalate (PET) has superior physical properties, e.g., resistance to chemical attack, and desirable mechanical and electrical properties. Despite these superior physical properties, PET is not always the material of choice for injection molding usage because relatively high mold temperatures, e.g., 120°–140° C., must be utilized to insure good moldability. Any attempt to use a lower mold temperature, e.g., 100° C. or lower, results in the injected material being unmoldable as, for one thing, the molded article sticks in the mold and often can only be removed with great difficulty. To circumvent this processing disadvantage, the molder is forced to select more expensive materials such as polybutylene terephthalate (PBT), inasmuch as this poly(alkylene terephthalate) is easily moldable even when using mold temperatures as low as 60° C. By being able to use a lower mold temperature for PBT, the time necessary for cooling the injection molded article to a temperature at which it can be removed from the mold is considerably shorter than the cooling time necessary before the PET article can be removed from a mold at 120° to 140° C. Since this shorter cool-down period of PBT results in a shorter process cycle time and a higher rate of article production, economic justification exists for its use despite its higher unit cost.

A welcome contribution to the art would be a PET composition which can be injection molded at relatively low mold temperatures (e.g., 100° C. and below) to yield articles exhibiting improved moldability characteristics, e.g., improved mold releasability and desirable physical properties.

Copending application Ser. No. 294,980, filed Aug. 21, 1981 describes thermoplastic injection moldable compositions composed of a polyethylene terephthalate, a hydrocarbyl ester of a monoepoxidized alkenoic acid, and an adjuvant such as sodium stearate, sodium carbonate, talc, etc. which improves the releasability from the injection mold of articles injection molded at temperatures at least as low as 93° C.

Copending application Ser. No. 392,221, filed June 25, 1982 describes thermoplastic injection moldable compositions composed of a polyethylene terephthalate, an epoxidized unsaturated triglyceride containing at least one epoxide group and an adjuvant such as sodium stearate, talc, mica, etc. which improves the releasability from the injection mold of articles injection molded at temperatures at least as low as 93° C.

Copending application Ser. No. 401,929, filed July 26, 1982 describes thermoplastic injection moldable compositions composed of a polyethylene terephthalate, an epoxy ester mixture containing at least one monoepoxy aliphatic monocarboxylic acid ester and at least one diepoxy aliphatic monocarboxylic acid ester and an adjuvant, such as sodium stearate, which improves the releasability from the injection mold of articles injection molded at temperatures at least as low as 93° C.

THE INVENTION

In accordance with this invention there is provided a thermoplastic injection moldable composition with improved moldability which comprises an intimate admixture of:

(a) a polyethylene terephthalate; and (b) at least one monoepoxyalkane, preferably a 1,2-epoxyalkane, having from about 10 to about 50 and preferably from about 10 to about 30 carbon atoms in the molecule.

In another embodiment of this invention, the moldability is further improved by the addition of:

(c) an adjuvant synergistically cooperative with the monoepoxyalkane (preferably 1,2-epoxyalkane) of (b) to improve the releasability from the injection mold, of articles injection molded from said composition at mold temperatures of at least as low as 93° C.

Because of the synergistic cooperation between the components (b) and (c) above, the compositions may be molded at relatively low mold temperatures (e.g., in the range of about 50° C. to about 100° C.) without excessive sticking being encountered.

It will be understood, of course, that if desired the compositions of this invention may be injection molded at even higher mold temperatures (e.g., about 100° to about 150° C.).

A distinct advantage of the compositions of this invention is the highly desirable color characteristics which they possess. More particularly they exhibit a neutral to creme white color even without use of any colorizing agents. Thus the compositions can be used for molding parts having attractive appearance and coloration even though a colorizing agent is not employed therein. When colored objects are desired, the color characteristics of the blends are also of advantage in that the quantity of colorants used will be significantly less as compared to blends having a less neutral coloration.

A further aspect of this invention is that the compositions may additionally contain reinforcing amounts of a reinforcing filler, e.g., glass fibers either alone or in combination with particulate mineral fillers. Other additives may also be used in the composition such as flame retardants, impact modifiers and the like.

The polyethylene terephthalate used herein is preferably homopolymeric PET although crystallizable PET copolymers may also be used. Exemplary of useful PET copolymers are those copolymers in which the copolymer contains at least 80 mol percent of repeating units derived from terephthalic acid and ethylene glycol with the remainder (20 mol percent or less) being derived from other well known acid and/or glycol components. Representative acid components are phthalic acid, isophthalic acid, naphthalene 1,4- or 2,6-dicarboxylic acid, diphenyl-4,4'-dicarboxylic acid, diphenyl ether-4,4'-dicarboxylic acid, adipic acid, sebacic acid as well as their halogenated (preferably brominated) counterparts. The glycol components may be diethylene glycol, neopentyl glycol, cyclohexanedimethanol, 2,2-bis(4-hydroxyphenyl) propane, 1,3-propanediol, 1,4-butanediol, dibromoneopentyl glycol, the bis(2-hydroxyethyl) ether of tetrabromobisphenol A, tetrabromo-p-xylylene glycol and the like.

The polyethylene terephthalates used herein can be virgin PET or reclaimed PET. Also, the PET used in the compositions of this invention should be injection moldable and thus generally will have an intrinsic viscosity (I.V.) as low as 0.3 and preferably between about 0.4 and 1.2, more preferably between about 0.5 and 1.0, as measured at 25° C. in a solvent consisting of 60 percent by weight phenol and 40 percent by weight of tetrachloroethane. For most injection molding applications polyethylene terephthalates in which the I.V. is in the range of 0.4 to 0.9 are most preferred.

The monoepoxyalkanes utilized in the compositions of this invention have from about 10 to about 50 carbon atoms (preferably from about 10 to about 30 carbon atoms) in the molecule and may be utilized individually or as mixtures.

A few illustrative examples of monoepoxyalkanes suitable for use in this invention are: 3,4-epoxypentacosane; 9,10-epoxytriacontane; 7,8-epoxytetracontane; 2,3-epoxy-5,7,7-trimethyloctane, and the like.

Examples of preferred 1,2-epoxyalkanes include but are not limited to, the following: 1,2-epoxydecane; 1,2-epoxyundecane; 1,2-epoxydodecane; 1,2-epoxytridecane; 1,2-epoxytetradecane; 1,2-epoxypentadecane; 1,2-epoxyhexadecane; 1,2-epoxyheptadecane; 1,2-epoxyoctadecane; 1,2-epoxynonadecane; 1,2-epoxyeicosane; 1,2-epoxyheneicosane; 1,2-epoxydocosane; 1,2-epoxytricosane; 1,2-epoxytetracosane; 1,2-epoxypentacosane; 1,2-epoxyhexacosane; 1,2-epoxyheptacosane; 1,2-epoxyoctacosane; 1,2-epoxynonacosane; 1,2-epoxytriacontane; the branched chain isomers of any of the foregoing; and the like. Some of the 1,2-epoxyalkanes are available commercially under the following product designations:

(a) Vikolox 10 (1,2-epoxydecane);
(b) Vikolox 12 (1,2-epoxydodecane);
(c) Vikolox 14 (1,2-epoxytetradecane);
(d) Vikolox 16 (1,2-epoxyhexadecane);
(e) Vikolox 18 (1,2-epoxyoctadecane); and
(f) Vikolox 20 (1,2-epoxyeicosane).

Examples of mixtures include, but are not limited to, mixtures of 1,2-epoxyalkanes comprising 1,2-epoxyalkanes from the $C_{11}$ (1,2-epoxyundecane) to the $C_{14}$ (1,2-epoxytetradecane) range; from the $C_{15}$ (1,2-epoxypentadecane) to the $C_{18}$ (1,2-epoxyoctadecane) range; from the $C_{20}$ (1,2-epoxyeicosane) to the $C_{24}$ (1,2-epoxytetracosane) range; and from the $C_{24}$ (1,2-epoxytetracosane) to the $C_{30}$ (1,2-epoxytriacontane) range.

More specifically, examples of mixtures of 1,2-epoxyalkanes include, but are not limited to, the following:

(a) a mixture of 1,2-epoxyalkanes chosen from the $C_{11}$ to the $C_{14}$ range comprising 25% 1,2-epoxyundecane, 23% 1,2-epoxydodecane, 25% 1,2-epoxytridecane and 27% 1,2-epoxytetradecane, available commercially under the product designation Vikolox 11-14;

(b) a mixture of 1,2-epoxyalkanes chosen from the $C_{15}$ to $C_{18}$ range comprising 28% 1,2-epoxypentadecane, 28% 1,2-epoxyhexadecane, 28% 1,2-epoxyheptadecane and 16% 1,2-epoxyoctadecane, available commercially under the product designation Vikolox 15-18;

(c) a mixture of 1,2-epoxyalkanes chosen from the $C_{20}$ to $C_{24}$ range comprising 47% 1,2-epoxyeicosane, 44% 1,2-epoxydocosane and 9% 1,2-epoxytetracosane, available commercially under the product designation Vikolox 20-24; and (d) a mixture of 1,2-epoxyalkanes chosen from the $C_{24}$ to $C_{30}$ range comprising 24% 1,2-epoxytetracosane, 45% 1,2-epoxyhexacosane, 22% 1,2-epoxyoctacosane and 9% 1,2-epoxytriacontane, available commercially under the product designation Vikolox 24-28.

The 1,2-epoxyalkanes and the 1,2-epoxyalkane blends heretofore described under the various Vikolox product designations are available commercially from Viking Chemical Company, 838 Baker Building, Minneapolis, Minn. 55402.

Although at least one or more monoepoxyalkanes having from about 10 to about 50 carbon atoms in the molecule may be utilized in the compositions of this invention, processing considerations and availability make it convenient to use one or more 1,2-epoxyalkanes within the range of about 12 to about 30 carbon atoms.

The compositions of this invention preferably have an amount of at least one monoepoxyalkane within the range of from about 0.5 to about 12 and most preferably from about 2 to about 8 parts per hundred parts of PET. Preferred compositions of this invention preferably have, in addition to at least one monoepoxyalkane, an amount of a synergistic adjuvant within the range of from about 0.05 to about 5 and most preferably from about 0.1 to about 3 parts per hundred parts of PET.

The compositions of this invention utilizing the combination of a synergistic adjuvant and at least one monoepoxyalkane exhibit a more significant enhancement of PET moldability.

Synergistic effect is exhibited by the use of alkali metal salts of aliphatic monocarboxylic acids, alkali metal salts of aromatic carboxylic acids, alkali metal salts of carbonic acid, ionomer resins having alkali metal cations, and the like. The sodium and potassium salts are preferred. Examples include, but are not limited to, the following: the sodium and potassium salts of formic acid, acetic acid, propionic acid, butyric acid, valeric acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid, heneicosanoic acid, behenic acid, tricosanoic acid, tetracosanoic acid, pentacosanoic acid, cerotic acid, montanic acid, methacrylic acid, acrylic acid and the like; lithium stearate and the like; the sodium and potassium salts of benzoic acid, toluic acid, p-tert-butylbenzoic acid, salicylic acid, vanillic acid, protocatechuic acid, veratric acid, gallic acid, phthalic acid, isophthalic acid, terephthalic acid, homophthalic acid and the like; sodium carbonate, potassium carbonate and the like; and ionomer resins (sodium salt) with a melt flow index of 2.8 such as that available from E. I. du Pont de Nemours & Co., Wilmington, Del., under the product designation Surlyn 1605, and the like. While less preferable, use may be made of the sodium or potassium salts of mildly unsaturated aliphatic monocarboxylic acids, such as the salts of oleic acid, ricinoleic acid, linoleic acid, palmitoleic acid, vaccenic acid, erucic acid and the like.

Preferred salts are sodium formate, sodium acetate, sodium stearate, potassium stearate, lithium stearate, sodium benzoate, sodium methacrylate, sodium carbonate and an ionomer resin (sodium salt) with a melt flow index of 2.8 such as that available from E. I. du Pont de Nemours & Company under the product designation Surlyn 1605.

Preferred monoepoxyalkane-adjuvant combinations for use in this invention are the combinations of a 1,2-epoxyalkane or a mixture of 1,2-epoxyalkanes and ionomer resins (sodium salts) with a melt flow index of 2.8 such as that available from E. I. du Pont de Nemours & Co. under the product designation Surlyn 1605 or an alkali metal salt of an aliphatic monocarboxylic acid or an alkali metal salt of an aromatic carboxylic acid or an alkali metal salt of a carbonic acid. It is most preferred to use the potassium or sodium salts of these acids.

Sodium stearate can be purchased from several sources; for example, it is available as Sodium Stearate T-1 produced by Witco Chemical Corporation, Organic Division, New York, N.Y. 10017.

As mentioned previously, other additives may also be utilized in the composition of this invention. For example, it is most useful if the composition additionally contains a reinforcing filler. This filler, depending on its nature, can increase the strength and impact qualities of the PET composition. In fact, the use of a reinforcing filler is often required by most present day commercial usage of injection molded PET. In general, any reinforcement can be used, e.g., fibers, whiskers, or platelets of metals, e.g., aluminum, iron or nickel, and the like, and non-metals, e.g., ceramics, carbon filaments, silicates, asbestos, titanate whiskers, quartz, glass flakes and fibers, and the like. Although it is only necessary to have at least a reinforcing amount of the reinforcing filler present, in general, the filler will comprise from about 10 to about 160 parts per hundred of the unreinforced polyethylene terephthalate resin. Amounts of filler, especially glass fibers, in the range of from about 30 to about 140 parts per hundred of the unreinforced PET are preferred as such compositions have particularly desirable properties. From the standpoint of ease of injection molding usage, reinforced compositions of this invention, especially those using glass fibers, preferably contain a filler constituent in an amount within the range of from about 30 to about 90 parts per hundred parts by weight of the unreinforced polyethylene terephthalate resin.

Of the various fillers that may be used in the compositions of this invention, the preferred reinforcing fillers are glass. It is most preferred to use fibrous glass filaments of lime-aluminum borosilicate glass that are relatively soda free. This is known as "E" glass. The length of the glass filaments and whether they are bundled into fibers and the fibers bundled in turn to yarns, etc., is not critical to this invention. However, it has been found convenient to use glass strands of from about ⅛ inch long. It is to be understood that during compounding considerable fragmentation of the strands will occur and that even further reduction of length occurs in the final injection molded article.

Other additives may also be utilized in the composition of this invention to achieve certain desirable characteristics in the final injection molded product. For example, flame retardants may be added if the end use of the product requires the product to be possibly subjected to ignition sources. Flame-retarding additives which can be used for the compositions according to the invention comprise a large number of chemical compounds which are well known to those skilled in the art. In general, they contain chemical elements which are used because of their flame-retarding capacity, for example, bromine, chlorine, antimony, phosphorus and nitrogen. Preferably, the flame-retarding additives are bromine and/or chlorine containing organic compounds (optionally used together with auxiliary compounds, such as antimony trioxide, zinc borate, etc.) or elementary phosphorus or phosphorus compounds such as ammonium polyphosphate, various bromine and/or chlorine containing organic phosphate esters, hexaphenoxyphosphazene and the like. To improve impact resistance, impact modifiers may be added to the composition of this invention. Exemplary of suitable impact modifiers are ethylene-vinyl acetate copolymers, ethylene-acrylic acid copolymers (having some of the acid functions neutralized), ethylene-methacrylic acid copolymers (having some of the methacrylic acid functions neutralized), ethylene-alkyl acrylate-methacrylic acid terpolymer (also having some of the methacrylic acid functions neutralized), ABS, methyl methacrylate grafted polybutadiene, methyl methacrylate grafted poly(alkyl acrylates), methyl methacrylate-stryene grafted rubbers, oxidized polyethylene, styrene-butadiene-styrene (S-B-S) block copolymers, styrene-butadiene multiblock copolymers, styrene-butadiene radial block copolymers, hydrogenated S-B-S block copolymers, styrene-butadiene rubber, terpolymers of ethylene, vinyl acetate and glycidyl methacrylate, copolymers of ethylene and glycidyl methacrylate, block copolymers of butadiene, styrene, and caprolactone, acrylic rubbers, EPDM, ethylene-methyl acrylate copolymers, ethylene-ethyl acrylate copolymers, polyester-ether multiblock copolymers such as copolymers of butylene glycol, polytetramethylene ether glycol and terephthalic acid, aliphatic esters such as poly(ethylene adipate), polycarbonate, and the like. Amounts of impact modifiers generally fall within the range of from about 5 to about 25 parts per hundred parts of PET.

For protection against thermo-oxidative degradation, the customary amounts of stabilizers, preferably from about 0.001 to about 0.5 parts per hundred based upon the weight of the unstabilized composition, can be added to the compositions of this invention. Examples of suitable stabilizers are phenols and phenol derivatives, preferably sterically hindered phenols which contain alkyl substituents with up to 6 carbon atoms in the position(s) ortho to the phenolic hydroxyl group(s); amines, preferably secondary arylamines and their derivatives; phosphates and phosphites, preferably the aryl derivatives thereof; and quinones. A few non-limiting examples include 4,4'-bis(2,6-di-tert-butylphenol),
1,3,5-trimethyl-2,4,6-tris(3,5-di-tert-butyl-4-hydroxybenzyl)benzene,
4,4'-methylenebis(2,6-di-tert-butylphenol),
4,4'-butylidenebis(6-tert-butyl-m-cresol),
3,5-di-tert-butyl-4-hydroxybenzylphosphonic acid diethyl ester,
N,N'-bis(β-naphthyl)-p-phenylenediamine,
N,N'-bis(1-methylheptyl)-p-phenylenediamine,
phenyl-β-naphthylamine,
4,4'-bis(α,α-dimethylbenzyl)diphenylamine,
hydroquinone,
p-benzoquinone,
p-tert-butylpyrocatechol,
chloranil, and
naphthoquinone.

To the compositions of this invention there may be additionally added ultraviolet ray absorbents, lubricants, antistatic agents, colorizing agents, antifungal agents, foaming agents, etc. depending upon the ultimate use of the molded product.

The compositions of this invention can be prepared by blending the various components in a blender, e.g., a tumble blender or a Henschel mixer, compounding the mixture in an extruder, e.g., a twin-screw 28 mm Werner-Pfleiderer extruder, and thereafter chopping the extrudate into pellets. The resultant product is suitable for use in injection molding operations. It is noteworthy that the compositions of this invention can be satisfactorily injection molded at mold temperatures less than 100° C. with an acceptably short cycle time and with the molded article exhibiting physical properties which are commercially attractive or which at least have commercial potential.

The present invention is further illustrated in the following examples, which are not to be construed as limiting.

EXAMPLES

The various PET compositions of these Examples were prepared by mixing the components to form a premix, compounding the premix in a single screw extruder at temperatures of about 500° F. (260° C.), and molding the pellets into an article on a reciprocating screw injection molding machine. The injection mold was suitably shaped and dimensioned for providing an article having the configuration shown in the FIGURE—which is a top plan view of the article. The mold utilized was a center gated mold having a nonmoveable planar sprue side and a movable cavity side. As can be seen in the FIGURE the article formed by the mold has a plurality of runners, labeled "A", which terminate into various test pieces. Emanating from the center of the runner grid is a conventional tapered sprue. Two of the test pieces are rectangular bars and are labeled with the letter "B". These "B" bars are about six inches long, ½ inch wide and ¼ inch thick. The test piece labeled "C" in the FIGURE is a rectangular bar which is 2½ inches long, ½ inch wide and ⅛ inch thick. The two "dog bone" shaped test pieces are labeled "D" and are used for the testing of tensile properties. They measure about 6½ inches long, ⅛ inch thick and ¾ inch in width at each of their ends and ¼ inch in width at their middles. The test piece labeled "E" is 4 inches long, 2¾ inches wide and ⅛ inch thick. The runners and sprue are approximately ⅜ inch in cross sectional width. This configuration for the test article was chosen for its complexity and for its yield of test specimens which are used in accordance with well recognized standard tests. The complexity of the article configuration was also thought sufficient to give a good prediction of moldability performance of the composition when used to form typical commercial articles.

The polyethylene terephthalate, glass and other ingredients used in the various compositions of the Examples were as follows:

Polyethylene terephthalate (PET); from Goodyear Tire and Rubber Company; Vituf 5901—crystalline PET having an intrinsic viscosity of 0.59 measured at 25° C. in solvent consisting of 60 percent by weight phenol and 40 percent by weight of tetrachloroethane Glass fiber strands; Owens-Corning Fiberglas Corp., Owens-Corning Fiberglas 419 AA (3/16 inch chopped strands)

1,2-epoxyalkanes; from Viking Chemical Company, 838 Baker Building, Minneapolis, Minn. 55402; Vikolox 10, 12, 14, 16, 18, 20, 11-14, 15-18, 20-24 and 24-28

Sodium stearate; from Witco Chemical Company; T-1 or Heat Stable grade.

Table I (Examples 1–4) and Table II (Examples 5–13) report the moldability characteristics of various compositions of this invention. Example 4 (Table I) and Example 13 (Table II) are examples of compositions that do not contain an adjuvant. Moldability of the compositions was evaluated by determining "the number of sticks" (i.e., the number of times the molding cycle had to be stopped and a molded specimen physically removed from the mold) in relation to the "number of shots" (i.e., the number of injections) that were made with the given PET composition. In severe cases, removal of a stuck part required prying or chiseling; in less severe cases, removal was possible by hand.

In Examples 1–13, the mold temperature was kept at approximately 200° F. (93° C.). All parts shown in Tables I and II are by weight.

TABLE I

Molding Characteristics of Various PET Compositions

| | EXAMPLES | | | |
|---|---|---|---|---|
| | 1 | 2 | 3 | 4 |
| Composition | | | | |
| Polyethylene Terephthalate, parts | 100 | 100 | 100 | 100 |
| Glass Fiber, phr* | 43 | 43 | 43 | 43 |
| Vikolox 10$^a$, phr* | 3 | — | — | 3 |
| Vikolox 12$^b$, phr* | — | 3 | — | — |
| Vikolox 14$^c$, phr* | — | — | 3 | — |
| Sodium Stearate, phr* | 0.5 | 0.5 | 0.5 | — |
| Moldability | | | | |
| Number of Sticks/ Number of Shots | 1/12 | 0/21 | 0/20 | 6/13 |

*Parts per 100 parts PET
$^a$1,2-Epoxydecane from Viking Chemical Co.
$^b$1,2-Epoxydodecane from Viking Chemical Co.
$^c$1,2-Epoxytetradecane from Viking Chemical Co.

TABLE II

Molding Characteristics of Various PET Compositions

| | EXAMPLES | | | | | | | | |
|---|---|---|---|---|---|---|---|---|---|
| | 5 | 6 | 7 | 8 | 9 | 10 | 11 | 12 | 13 |
| Composition | | | | | | | | | |
| Polyethylene Terephthalate, parts | 100 | 100 | 100 | 100 | 100 | 100 | 100 | 100 | 100 |
| Glass Fiber, phr* | 43 | 43 | 43 | 43 | 43 | 43 | 43 | 43 | 43 |
| Vikolox 24–28$^a$, phr* | 3 | 3 | 3 | 3 | 3 | 3 | 3 | 3 | 3 |
| Sodium Acetate, phr* | 0.5 | — | — | — | — | — | — | — | — |
| Sodium Benzoate, phr* | — | 0.5 | — | — | — | — | — | — | — |
| Surlyn 1605$^b$, phr* | — | — | 0.5 | — | — | — | — | — | — |
| Sodium Carbonate, phr* | — | — | — | 0.5 | — | — | — | — | — |
| Sodium Methacrylate, phr* | — | — | — | — | 0.5 | — | — | — | — |
| Lithium Stearate, phr* | — | — | — | — | — | 0.5 | — | — | — |
| Potassium Stearate, phr* | — | — | — | — | — | — | 0.5 | — | — |
| Sodium Formate, phr* | — | — | — | — | — | — | — | 0.5 | — |
| Moldability | | | | | | | | | |
| Number of Sticks/ | | | | | | | | | |

TABLE II-continued

Molding Characteristics of Various PET Compositions

| | EXAMPLES | | | | | | | | |
|---|---|---|---|---|---|---|---|---|---|
| | 5 | 6 | 7 | 8 | 9 | 10 | 11 | 12 | 13 |
| Number of Shots | 0/14 | 0/15 | 4/16 | 0/14 | 0/13 | 6/18 | 0/17 | 0/11 | 6/15 |

*Parts per 100 parts PET
[a]Viking Chemical Co. blend of 24% $C_{24}$, 45% $C_{26}$, 22% $C_{28}$, and 9% $C_{30}$ 1,2-epoxyalkanes
[b]Ionomer resin (sodium salt), melt flow index 2.8, from E. I. du Pont de Nemours & Co.

The data shown in Table III and IV illustrate the good balance of physical properties exhibited by articles injection molded from compositions of this invention. Here again the mold temperatures were kept at about 200° F. (93° C.). Injection molded test bars were obtained from the illustrative compositions of Examples 1-4 (Table III) and 5-9 and 13 (Table IV). The test bars were tested according to ASTM procedures to evaluate the physical properties set forth in Tables III and IV. The ASTM designation numbers for the procedures used were as follows:

Specific Gravity—D 792-66 (1975)
Tensile Yield, and Tensile Modulus—D 638-77a
Flexural Strength and Flexural Modulus—D 790-71 (1978)
Izod Impact—D 256-78
Heat Deflection Temperature—D 648-72 (1978)
Rockwell Hardness—D 785-65 (1976).

TABLE III

Physical Properties of Various PET Compositions

| | Examples | | | |
|---|---|---|---|---|
| | 1 | 2 | 3 | 4 |
| Composition | | | | |
| Polyethylene Terephthalate, parts | 100 | 100 | 100 | 100 |
| Glass Fiber, phr* | 43 | 43 | 43 | 43 |
| Vikolox 10[a], phr* | 3.0 | — | — | 3 |
| Vikolox 12[b], phr* | — | 3.0 | — | — |
| Vikolox 14[c], phr* | — | — | 3.0 | — |
| Sodium Stearate, phr* | 0.5 | 0.5 | 0.5 | — |
| Properties | | | | |
| Specific Gravity | 1.605 | 1.592 | 1.592 | 1.562 |
| Tensile Yield, $10^3$ psi | 19.2 | 19.3 | 19.6 | 20.7 |
| Tensile Elastic Modulus, $10^6$ psi | 1.43 | 1.61 | 1.39 | 1.39 |
| Flexural Strength, $10^3$ psi | 29.1 | 29.4 | 28.7 | 32.6 |
| Flexural Elastic Modulus, $10^6$ psi | 1.42 | 1.39 | 1.39 | 1.28 |
| Izod Impact, ¼" bar, ft-lb/in. | 1.5 | 1.7 | 1.7 | 1.5 |
| Izod Impact, ⅛" bar, ft-lb/in. | 1.8 | 1.9 | 1.8 | 1.7 |
| Heat Deflection Temperature @ 264 psi, °C. | 242 | 240 | 242 | 229 |
| Heat Deflection Temperature @ 66 psi, °C. | 253 | 252 | 251 | 250 |
| Rockwell Hardness, R Scale | 122 | 122 | 123 | — |

*Parts per 100 parts PET
[a]1,2-Epoxydecane from Viking Chemical Co.
[b]1,2-Epoxydodecane from Viking Chemical Co.
[c]1,2-Epoxytetradecane from Viking Chemical Co.

TABLE IV

Physical Properties of Various PET Compositions

| | Examples | | | | | |
|---|---|---|---|---|---|---|
| | 5 | 6 | 7 | 8 | 9 | 13 |
| Composition | | | | | | |
| Polyethylene Terephthalate, parts | 100 | 100 | 100 | 100 | 100 | 100 |
| Glass Fiber, phr* | 43 | 43 | 43 | 43 | 43 | 43 |
| Vikolox 24-28[a], phr* | 3 | 3 | 3 | 3 | 3 | 3 |
| Sodium Acetate, phr* | 0.5 | — | — | — | — | — |
| Sodium Benzoate, phr* | — | 0.5 | — | — | — | — |
| Surlyn 1605[b], phr* | — | — | 0.5 | — | — | — |
| Sodium Carbonate, phr* | — | — | — | 0.5 | — | — |
| Sodium Methacrylate, phr* | — | — | — | — | 0.5 | — |
| Properties | | | | | | |
| Specific Gravity | 1.576 | 1.577 | 1.554 | 1.572 | 1.580 | 1.546 |
| Tensile Yield, $10^3$ psi | 18.5 | 17.4 | 17.7 | 17.5 | 17.4 | 19.1 |
| Tensile Elastic Modulus, $10^6$ psi | 1.47 | 1.51 | 1.43 | 1.29 | 1.58 | 1.36 |
| Flexural Strength, $10^3$ psi | 29.7 | 28.8 | 27.3 | 28.6 | 26.9 | 30.621 |
| Flexural Elastic Modulus, $10^6$ psi | 1.35 | 1.36 | 1.27 | 1.30 | 1.34 | 1.28 |
| Izod Impact, ¼" bar, ft-lb/in. | 1.4 | 1.5 | 1.4 | 1.2 | 1.6 | 1.4 |
| Izod Impact, ⅛" bar, ft-lb/in. | 1.7 | 1.8 | 1.6 | 1.5 | 2.0 | 1.7 |
| Heat Deflection Temperature @ 264 psi, °C. | 236 | 234 | 235 | 234 | 237 | 231 |
| Heat Deflection Temperature @ 66 psi, °C. | 252 | 250 | 250 | 254 | 256 | 251 |

*Parts per 100 parts PET
[a]Viking Chemical Co. blend of 24% $C_{24}$, 45% $C_{26}$, 22% $C_{28}$, and 9% $C_{30}$ 1,2-Epoxyalkanes
[b]Ionomer resin (sodium salt), melt flow index 2.8, from E. I. du Pont de Nemours & Co.

Table V reports the moldability characteristics of compositions not in accordance with this invention (Comparative Examples 14 and 15). Moldability is defined and was determined in the same manner as in Examples 1-13.

TABLE V

Molding Characteristics of PET Compositions Not of This Invention

| | Comparative Examples | |
|---|---|---|
| | 14 | 15 |
| Composition | | |
| Polyethylene Terephthalate, parts | 100 | 100 |
| Glass Fiber, | | |

TABLE V-continued
Molding Characteristics of PET Compositions Not of This Invention

|  | Comparative Examples | |
| --- | --- | --- |
|  | 14 | 15 |
| parts/100 parts PET | 43 | 43 |
| Sodium Stearate |  |  |
| parts/100 parts PET | — | 0.5 |
| Moldability |  |  |
| Number of Sticks/ |  |  |
| Number of Shots | 10/10** | 10/10** |

**Estimate - the number of shots were not recorded; however, in each run the molded specimen had to be physically removed from the mold.

The foregoing disclosure and description of the invention is illustrative and explanatory thereof and various changes in the illustrated compositions may be made within the scope of the appended claims without departing from the spirit of the invention.

We claim:

1. A thermoplastic composition which is injection-moldable at a relatively low mold temperature, said composition comprising an intimate admixture of:
   (a) a polyethylene terephthalate; and
   (b) at least one monoepoxyalkane having from about 10 to about 50 carbon atoms in the molecule.

2. The composition of claim 1 wherein said monoepoxyalkane contains from about 10 to about 30 carbon atoms in the molecule.

3. The composition of claim 1 wherein said monoepoxyalkane is a 1,2-epoxyalkane.

4. The composition of claim 3 wherein said 1,2-epoxyalkane is 1,2-epoxydecane, 1,2-epoxydodecane, 1,2-epoxytetradecane, 1,2-epoxyhexadecane, 1,2-epoxyoctadecane or 1,2-epoxyeicosane.

5. The composition of claim 3 wherein said 1,2-epoxyalkane is a mixture of at least two 1,2-epoxyalkanes.

6. The composition of claim 5 wherein said mixture of 1,2-epoxyalkanes comprises at least one of the following mixtures:
   (a) 1,2-epoxyundecane, 1,2-epoxydodecane, 1,2-epoxytridecane and 1,2-epoxytetradecane;
   (b) 1,2-epoxypentadecane, 1,2-epoxyhexadecane, 1,2-epoxyheptadecane and 1,2-epoxyoctadecane;
   (c) 1,2-epoxyeicosane, 1,2-epoxydocosane and 1,2-epoxytetracosane;
   (d) 1,2-epoxytetracosane, 1,2-epoxyhexacosane, 1,2-epoxyoctacosane and 1,2-epoxytriacontane.

7. The composition of claim 5 wherein said mixture of 1,2-epoxyalkanes comprises at least one of the following mixtures:
   (a) 25% 1,2-epoxyundecane, 23% 1,2-epoxydodecane, 25% 1,2-epoxytridecane and 27% 1,2-epoxytetradecane;
   (b) 28% 1,2-epoxypentadecane, 28% 1,2-epoxyhexadecane, 28% 1,2-epoxyheptadecane and 16% 1,2-epoxyoctadecane;
   (c) 47% 1,2-epoxyeicosane, 44% 1,2-epoxydocosane and 9% 1,2-epoxytetracosane;
   (d) 24% 1,2-epoxytetracosane, 45% 1,2 epoxyhexacosane, 22% 1,2-epoxyoctacosane and 9% 1,2-epoxytriacontane.

8. The composition of claim 1 wherein the monoepoxyalkane of (b) is present in an amount within the range of from about 0.5 to about 12 parts per hundred parts by weight of said polyethylene terephthalate.

9. The composition of claim 1 wherein the monoepoxyalkane of (b) is present in an amount within the range of from about 2 to about 8 parts per hundred parts by weight of said polyethylene terephthalate.

10. The composition of claim 1 wherein said composition additionally contains a reinforcing filler.

11. The composition of claim 10 wherein said reinforcing filler comprises glass fibers.

12. The composition of claim 1 wherein (a) is polyethylene terephthalate having an intrinsic viscosity in the range of 0.4 to 0.9 as measured at 25° C. in a solvent consisting of 60% by weight of phenol and 40% by weight of tetrachloroethane.

13. A thermoplastic composition which is injection-moldable at a relatively low mold temperature, said composition comprising an intimate admixture of:
   (a) polyethylene terephthalate having an intrinsic viscosity in the range of 0.4 to 0.9 as measured at 25° C. in a solvent consisting of 60% by weight of phenol and 40% by weight of tetrachlorethane;
   (b) at least one monoepoxyalkane having from about 10 to about 50 carbon atoms in the molecule; and
   (c) glass fiber reinforcing filler present in an amount of from about 30 to about 140 parts per 100 parts by weight of the polyethylene terephthalate.

14. The composition of claim 13 wherein the monoepoxyalkane has from about 10 to about 30 carbon atoms in the molecule.

15. The composition of claim 13 wherein the monoepoxyalkane is a 1,2-epoxyalkane.

16. The composition of claim 15 wherein the 1,2-epoxyalkane of (b) is present in an amount within the range of from about 0.5 to about 12 parts per hundred parts by weight of said polyethylene terephthalate and wherein the 1,2-epoxyalkane of (b) comprises 1,2-epoxydecane, 1,2-epoxydodecane, 1,2-epoxytetradecane, 1,2-epoxyhexadecane, 1,2-epoxyoctadecane or 1,2-epoxyeicosane or at least one of the following mixtures:
   (a) 25% 1,2-epoxyundecane, 23% 1,2-epoxydodecane, 25% 1,2-epoxytridecane and 27% 1,2-epoxytetradecane;
   (b) 28% 1,2-epoxypentadecane, 28% 1,2-epoxyhexadecane, 28% 1,2-epoxyheptadecane and 16% 1,2-epoxyoctadecane;
   (c) 47% 1,2-epoxyeicosane, 44% 1,2-epoxydocosane and 9% 1,2-epoxytetracosane;
   (d) 24% 1,2-epoxytetracosane, 45% 1,2-epoxyhexacosane, 22% 1,2-epoxyoctacosane and 9% 1,2-epoxytriacontane.

17. A thermoplastic composition which is injection-moldable at a relatively low mold temperature, said composition comprising an intimate admixture of:
   (a) a polyethylene terephthalate; and
   (b) at least one monoepoxyalkane having from about 10 to about 50 carbon atoms in the molecule; and
   (c) an adjuvant synergistically cooperative with the monoepoxyalkane of (b) to improve the releasability from the injection mold, of articles injection molded from said composition at mold temperatures of at least as low as 93° C.

18. The composition of claim 17 wherein said monoepoxyalkane contains from about 10 to about 30 carbon atoms in the molecule.

19. The composition of claim 17 wherein said monoepoxyalkane is a 1,2-epoxyalkane.

20. The composition of claim 19 wherein said 1,2-epoxyalkane is 1,2-epoxydecane, 1,2-epoxydodecane, 1,2-epoxytetradecane, 1,2-epoxyhexadecane, 1,2-epoxyoctadecane or 1,2-epoxyeicosane.

21. The composition of claim 19 wherein said 1,2-epoxyalkane is a mixture of at least two 1,2-epoxyalkanes.

22. The composition of claim 21 wherein said mixture of 1,2-epoxyalkanes comprises at least one of the following mixtures:
   (a) 1,2-epoxyundecane, 1,2-epoxydodecane, 1,2-epoxytridecane and 1,2-epoxytetradecane;
   (b) 1,2-epoxypentadecane, 1,2-epoxyhexadecane, 1,2-epoxyheptadecane and 1,2-epoxyoctadecane;
   (c) 1,2-epoxyeicosane, 1,2-epoxydocosane and 1,2-epoxytetracosane;
   (d) 1,2-epoxytetracosane, 1,2-epoxyhexacosane, 1,2-epoxyoctacosane and 1,2-epoxytriacontane.

23. The compositions of claim 21 wherein said mixture of 1,2-epoxyalkanes comprises at least one of the following mixtures:
   (a) 25% 1,2-epoxyundecane, 23% 1,2-epoxydodecane, 25% 1,2-epoxytridecane and 27% 1,2-epoxytetradecane;
   (b) 28% 1,2-epoxypentadecane, 28% 1,2-epoxyhexadecane, 28% 1,2-epoxyheptadecane and 16% 1,2-epoxyoctadecane;
   (c) 47% 1,2-epoxyeicosane, 44% 1,2-epoxydocosane and 9% 1,2-epoxytetracosane;
   (d) 24% 1,2-epoxytetracosane, 45% 1,2-epoxyhexacosane, 22% 1,2-epoxyoctacosane and 9% 1,2-epoxytriacontane.

24. The composition of claim 17 wherein said adjuvant is an alkali metal salt of an aliphatic monocarboxylic acid or of an aromatic carboxylic acid or of carbonic acid.

25. The composition of claim 24 wherein said salt is a sodium or potassium salt.

26. The composition of claim 24 wherein said salt is sodium stearate, sodium acetate, sodium benzoate, sodium methacrylate, lithium stearate, potassium stearate, sodium formate or sodium carbonate.

27. The composition of claim 17 wherein said adjuvant is an ionomer resin (sodium salt) with a melt flow index of 2.8 such as the Surlyn 1605 type.

28. The composition of claim 19 wherein said 1,2-epoxyalkane comprises 1,2-epoxydecane, 1,2-epoxydodecane, 1,2-epoxytetradecane, 1,2-epoxyhexadecane, 1,2-epoxyoctadecane or 1,2-epoxyeicosane or at least one of the following mixtures:
   (a) 1,2-epoxyundecane, 1,2-epoxydodecane, 1,2-epoxytridecane and 1,2-epoxytetradecane;
   (b) 1,2-epoxypentadecane, 1,2-epoxyhexadecane, 1,2-epoxyheptadecane and 1,2-epoxyoctadecane;
   (c) 1,2-epoxyeicosane, 1,2-epoxydocosane and 1,2-epoxytetracosane;
   (d) 1,2-epoxytetracosane, 1,2-epoxyhexacosane, 1,2-epoxyoctacosane and 1,2-epoxytriacontane
and said adjuvant is an alkali metal salt of an aliphatic monocarboxylic acid or an alkali metal salt of an aromatic carboxylic acid or an alkali metal salt of carbonic acid or an ionomer resin (having alkali metal cations).

29. The composition of claim 19 wherein said 1,2-epoxyalkane comprises 1,2-epoxydecane, 1,2-epoxydodecane, 1,2-epoxytetradecane, 1,2-epoxyhexadecane, 1,2-epoxyoctadecane or 1,2-epoxyeicosane or at least one of the following mixtures:
   (a) 25% 1,2-epoxyundecane, 23% 1,2-epoxydodecane, 25% 1,2-epoxytridecane and 27% 1,2-epoxytetradecane;
   (b) 28% 1,2-epoxypentadecane, 28% 1,2-epoxyhexadecane, 28% 1,2-epoxyheptadecane and 16% 1,2-epoxyoctadecane;
   (c) 47% 1,2-epoxyeicosane, 44% 1,2-epoxydocosane and 9% 1,2-epoxytetracosane;
   (d) 24% 1,2-epoxytetracosane, 45% 1,2-epoxyhexacosane, 22% 1,2-epoxyoctacosane and 9% 1,2-epoxytriacontane
and said adjuvant is exemplified by sodium stearate, sodium acetate, sodium benzoate, sodium methacrylate, lithium stearate, potassium stearate, sodium formate, sodium carbonate or an ionomer resin (sodium salt) with a melt flow index of 2.8 such as the Surlyn 1605 type.

30. The composition of claim 17 wherein the monoepoxyalkane of (b) is present in an amount within the range of from about 0.5 to about 12 parts per hundred parts by weight of said polyethylene terephthalate and said adjuvant is present within the range of from about 0.05 to about 5 parts per hundred parts by weight of said polyethylene terephthalate.

31. The composition of claim 17 wherein the monoepoxyalkane of (b) is present in an amount within the range of from about 2 to about 8 parts per hundred parts by weight of said polyethylene terephthalate and said adjuvant is present in an amount of from about 0.1 to about 3 parts per hundred parts by weight of said polyethylene terephthalate.

32. The composition of claim 17 wherein said composition additionally contains a reinforcing filler.

33. The composition of claim 32 wherein said reinforcing filler comprises glass fibers.

34. The composition of claim 17 wherein (a) is polyethylene terephthalate having an intrinsic viscosity in the range of 0.4 to 0.9 as measured at 25° C. in a solvent consisting of 60% by weight of phenol and 40% by weight of tetrachloroethane.

35. A thermoplastic composition which is injection-moldable at a relatively low mold temperature, said composition comprising an intimate admixture of:
   (a) polyethylene terephthalate having an intrinsic viscosity in the range of 0.4 to 0.9 as measured at 25° C. in a solvent consisting of 60% by weight of phenol and 40% by weight of tetrachloroethane;
   (b) at least one 1,2-epoxyalkane having from about 10 to about 30 carbon atoms; and
   (c) an adjuvant synergistically cooperative with the 1,2-epoxyalkane of (b) to improve the releasability from the injection mold, of articles injection molded from said composition at mold temperatures of at least as low as 93° C.; and
   (d) glass fiber reinforcing filler present in an amount of from about 30 to about 90 parts per 100 parts by weight of the polyethylene terephthalate.

36. The composition of claim 35 wherein the 1,2-epoxyalkane of (b) is present in an amount within the range of from about 0.5 to about 12 parts per hundred parts by weight of said polyethylene terephthalate and wherein said adjuvant is an alkali metal salt of an aliphatic monocarboxylic acid or an alkali metal salt of an aromatic carboxylic acid or an alkali metal salt of carbonic acid or an ionomer resin (having alkali metal cations) and wherein said adjuvant is present within the range of from about 0.05 to about 5 parts per hundred parts by weight of said polyethylene terephthalate.

37. The composition of claim 36 wherein said 1,2-epoxyalkane comprises 1,2-epoxydecane, 1,2-epoxydodecane, 1,2-epoxytetradecane, 1,2-epoxyhexadecane, 1,2-epoxyoctadecane or 1,2-epoxyeicosane or at least one of the following mixtures:
- (a) 25% 1,2-epoxyundecane, 23% 1,2-epoxydodecane, 25% 1,2-epoxytridecane and 27% 1,2-epoxytetradecane;
- (b) 28% 1,2-epoxypentadecane, 28% 1,2-epoxyhexadecane, 28% 1,2-epoxyheptadecane and 16% 1,2-epoxyoctadecane;
- (c) 47% 1,2-epoxyeicosane, 44% 1,2-epoxydocosane and 9% 1,2-epoxytetracosane;
- (d) 24% 1,2-epoxytetracosane, 45% 1,2-epoxyhexacosane, 22% 1,2-epoxyoctacosane and 9% 1,2-epoxytriacontane and said adjuvant is exemplified by sodium stearate, sodium acetate, sodium benzoate, sodium methacrylate, lithium stearate, potassium stearate, sodium formate, sodium carbonate or an ionomer resin (sodium salt) with a melt flow index of 2.8 such as the Surlyn 1605 type.

* * * * *